United States Patent [19]

Coleman

[11] Patent Number: 4,486,874
[45] Date of Patent: Dec. 4, 1984

[54] CARRIAGE-ACTUATED DISC HANDLING APPARATUS FOR VIDEO DISC PLAYER

[75] Inventor: Clyde F. Coleman, Crawfordsville, Ind.

[73] Assignee: RCA Corporation, New York, N.Y.

[21] Appl. No.: 594,068

[22] Filed: Mar. 28, 1984

[51] Int. Cl.³ ............................................. G11B 17/04
[52] U.S. Cl. .................................................. 369/77.2
[58] Field of Search ...................... 369/77.2, 75, 75.1, 369/77.1

[56] References Cited

U.S. PATENT DOCUMENTS

| | | | |
|---|---|---|---|
| 4,196,906 | 4/1980 | Torrington | 274/14 |
| 4,326,284 | 4/1982 | Elliott | 369/77.2 |
| 4,357,698 | 11/1982 | Torrington | 369/77.2 |
| 4,381,559 | 4/1983 | Saito | 369/77.2 |
| 4,435,799 | 3/1984 | Kirschner | 369/77.2 |
| 4,439,852 | 3/1984 | Hughes | 369/77.2 |
| 4,451,912 | 5/1984 | Kirschner | 369/77.2 |

Primary Examiner—Charles Frankfort
Assistant Examiner—Thomas P. Matecki
Attorney, Agent, or Firm—Paul J. Rasmussen; William H. Meise; Dilip A. Kulkarni

[57] ABSTRACT

To load a record into the player, a caddy is inserted into the player and then withdrawn, thereby leaving the enclosed record inside the player resting on a pair of front and back receiver pads. As the pickup carriage moves toward the turntable for playback, the record is lowered to the turntable for rotation therewith without hindrance from the receiver pads. As the carriage is driven back to a standby position after playback, the record is transferred back to the receiver pads for retrieval.

12 Claims, 9 Drawing Figures

CARRIAGE-ACTUATED DISC HANDLING APPARATUS FOR VIDEO DISC PLAYER

This invention generally relates to a record playback system, and more particularly, it relates to a mechanism for transferring a record to and from a turntable.

In certain systems, picture and sound signals are stored on a disc record in the form of physical undulations in a continuous spiral track disposed on the record surface. The variations in electrical capacitance between an electrode disposed on a record-engaging pickup stylus and a conductive property of a turntable-supported record are sensed as the physical undulations on the record surface pass beneath the stylus tip. The capacitive variations are converted into electrical signals suitable for application to a conventional television receiver. A capacitance-type system is illustratively disclosed in U.S. Pat. No. 3,842,194 (Clemens).

The pickup stylus is typically housed in a protective cartridge, which is, in turn, installed in a translatable carriage. The carriage is slidably mounted in the player for motion along a path between a standby position out of registry with, and an end-of-play position in registry with a turntable-mounted record. Located on the carriage is a selectively-operated stylus lifting/lowering mechanism for the purpose of achieving a stylus/record engagement during playback. The player is equipped with a carriage drive motor for rapidly advancing the carriage to the start-of-play position, for causing the carriage to follow the stylus during playback, and for rapidly returning the carriage to its standby position after playback.

The video disc is enclosed in a caddy which comprises a record retaining spine removably located within an outer jacket or sleeve. The record retaining spine has an opening in which a record is received to form a record/spine assembly. For record loading, a full caddy is inserted into an input slot provided in the player. A record extracting mechanism disposed in the player removes the record/spine assembly from the caddy during subsequent jacket withdrawal, whereby the record is retained in the player resting on a set of record receiver pads. U.S. Pat. No. 4,451,912, of Kirschner discloses a suitable record extracting mechanism. The retained record is then transferred to the turntable for playback. For record retrieval, the record is transferred back to the receiver pads, and an empty jacket is reinserted into the player to recapture the record/spine assembly.

U.S. Pat. No. 4,196,906 (Torrington) shows one type of record transferring mechanism which employs a movably-mounted platform to support a retained record. To transfer the record to the turntable, the platform is depressed below the turntable allowing the record to be intercepted by the turntable. When the platform is raised above the turntable, it picks up the record from the turntable.

U.S. Pat. No. 4,326,284 (Elliott) illustrates another disc handling system wherein a retained record is supported on a stationary platform. When a movably-mounted turntable is raised above the platform, it lifts the record off the platform. To transfer the record back to the platform, the turntable is lowered below the platform to permit the record to be intercepted by the platform.

U.S. Pat. No. 4,439,852 of Hughes, discloses still another disc handling mechanism. The Hughes disc handling mechanism includes a record lifting finger which protrudes through a slot in the turntable to lift a record resting on a set of retractable record receiver pads disposed above the turntable. The record receiver pads are retracted out of the way, and the record lifting finger is lowered to a position beneath the turntable to deposit the record on the turntable for playback. The sequence of operations is reversed to transfer the record back to the record receiver pads. The record lifting finger elevates a turntable-supported record above the receiver pads. The record receiver pads are advanced, and the record lifting finger is withdrawn to achieve the transfer of the record back to the pads. An empty record sleeve is reinserted into the player to retrieve the record/spine assembly.

In accordance with this invention, a carriage-actuated disc handling mechanism is provided. The subject disc handling mechanism includes a pair of pivotally-mounted record receiver pads coupled to the respective one of a pair of movably-mounted actuated members. A pair of actuating members are symmetrically disposed on the carriage at a non-perpendicular angle to the carriage path. The angular actuating members engage the associated actuated members as the carriage arrives at an intermediate position thereof along the carriage path during the translation of the carriage from the end-of-play position toward the standby position. Further motion of the carriage toward the standby position displaces the actuated members in a direction substantially perpendicularly to the carriage path and in a manner lifting the record receiver pads, so that a turntable-supported record is transferred to the record receiver pads.

Pursuant to another aspect of the invention, during the translation of the carriage from the standby position to the intermediate position, the angular actuating members allow the motion of the actuated members in a manner permitting the record receiver pads to occupy the lowered position thereof to transfer a record disposed on the record receiver pads to the turntable for rotation therewith without hindrance from the receiver pads.

According to a further feature of the invention, each of the carriage-mounted actuating members has a leading portion that is disposed at a first angle to the carriage path for effecting motion of the associated record receiver pad at a first rate of speed during the initial translation of the carriage from the intermediate position toward the standby position. Each of the carriage-mounted actuating members has a further trailing portion that is arranged at a second angle to the carriage path for causing motion of the corresponding record receiver pad at a second rate of speed during further translation of the carriage toward the standby position.

Pursuant to still another feature of the invention, the second angle between the trailing portions and the carriage path is smaller than the first angle subtended by the leading portions of the actuating members so that the rate of translation of the record receiver pads is reduced as the carriage approaches the standby position, thereby, in turn, reducing the load on the carriage motor due to the translation of the record receiver pads, as the carriage arrives at the standby position.

Figure 1:
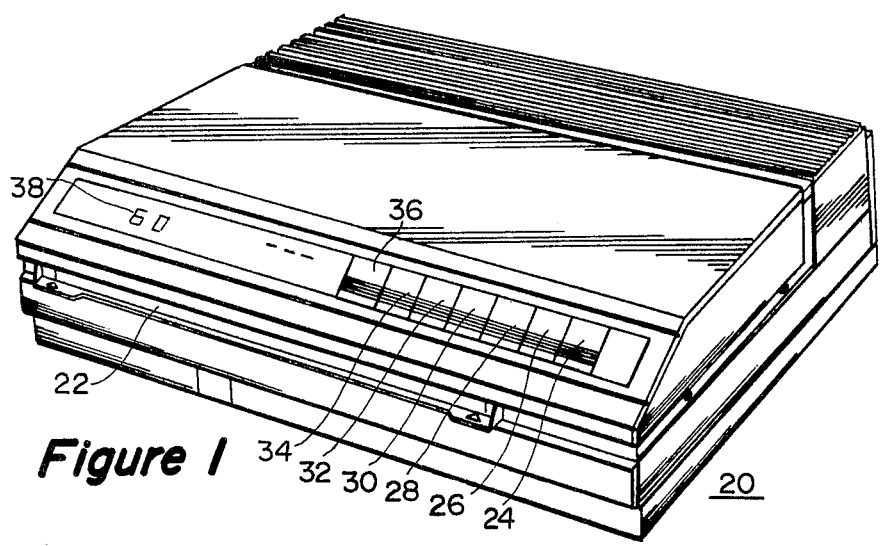
FIG. 1 shows a video disc player incorporating a carriage-actuated disc handling mechanism in accordance with the instant invention.
Figure 5:
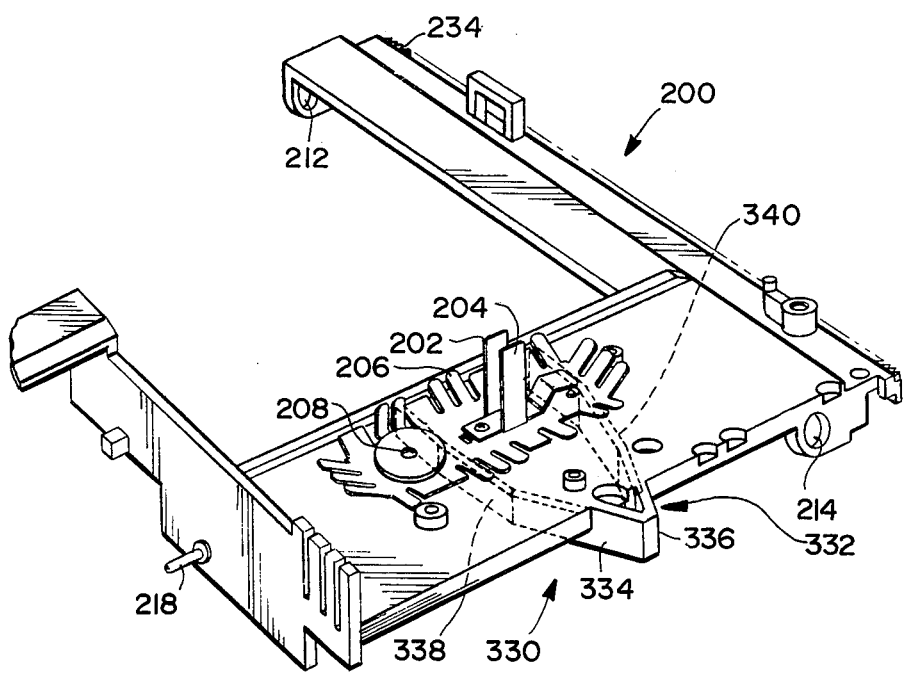
FIG. 5 is a perspective view of a translatable carriage on which the FIG. 4 interconnect board is mounted.
Figure 6:
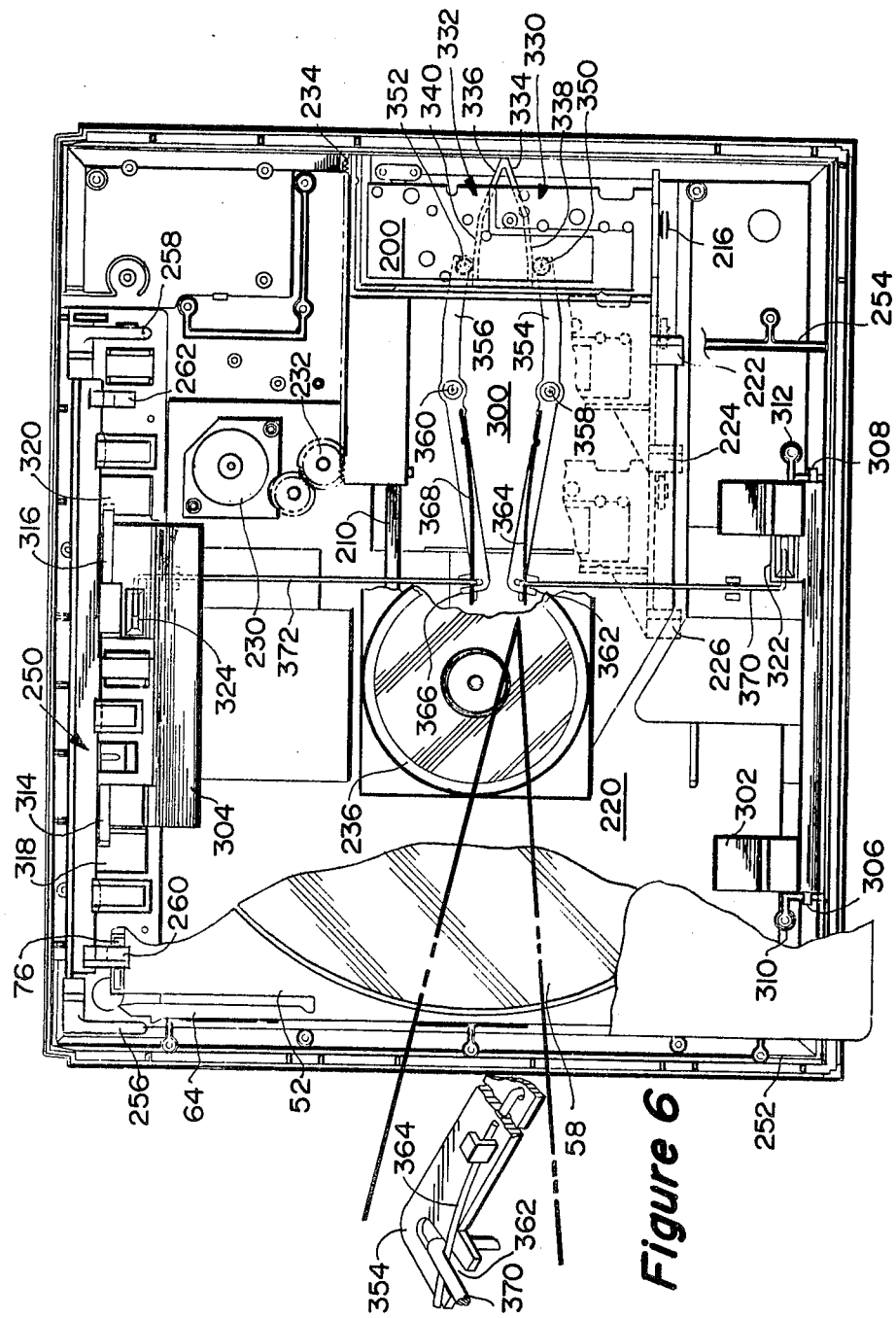
Figure 7:
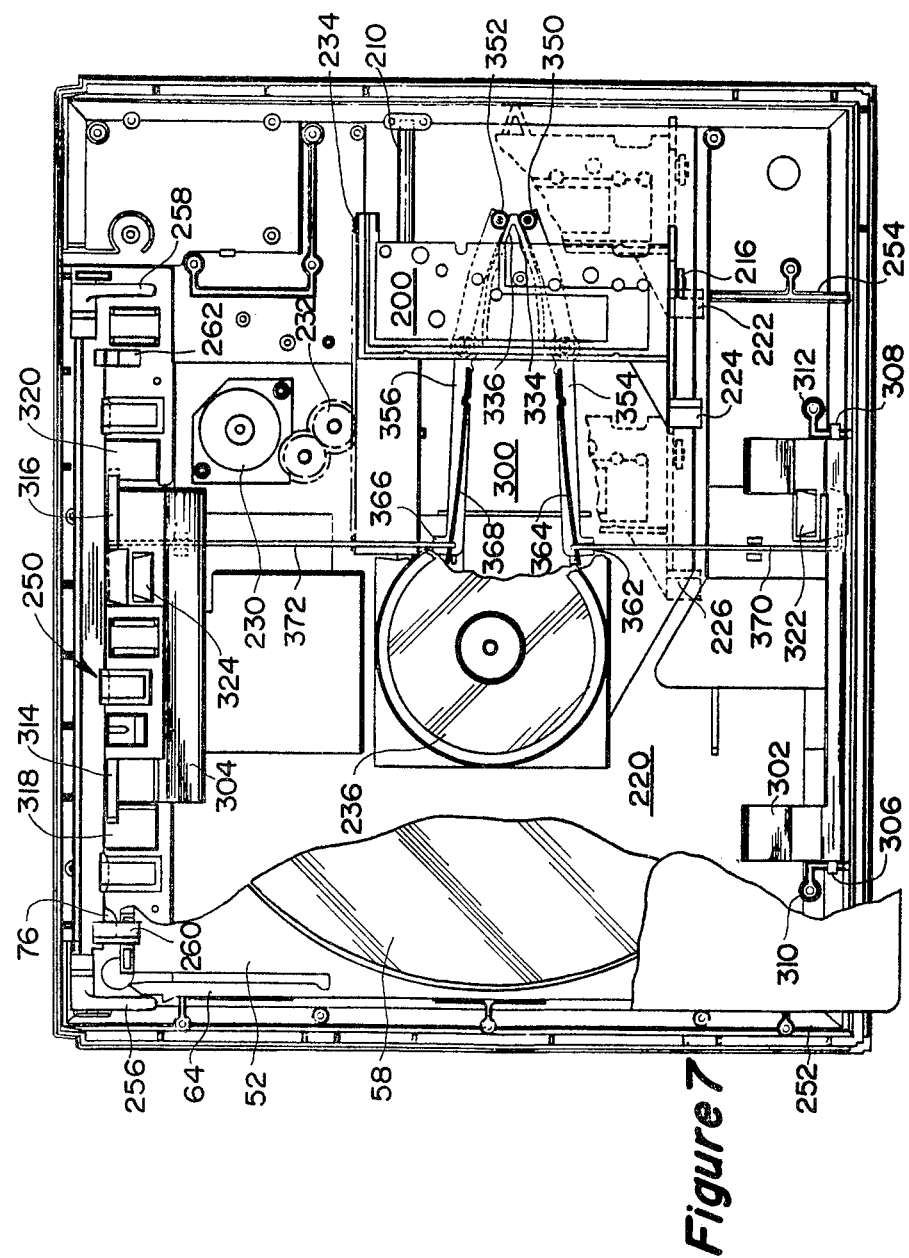
Figure 8:
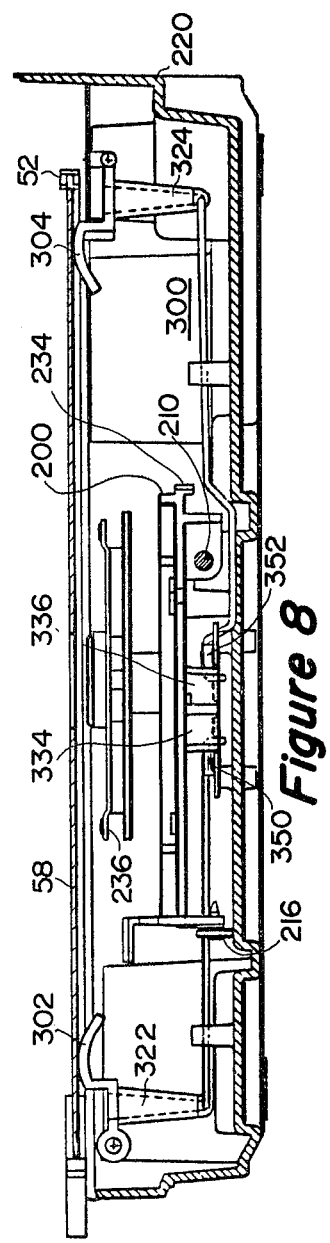
Figure 9:
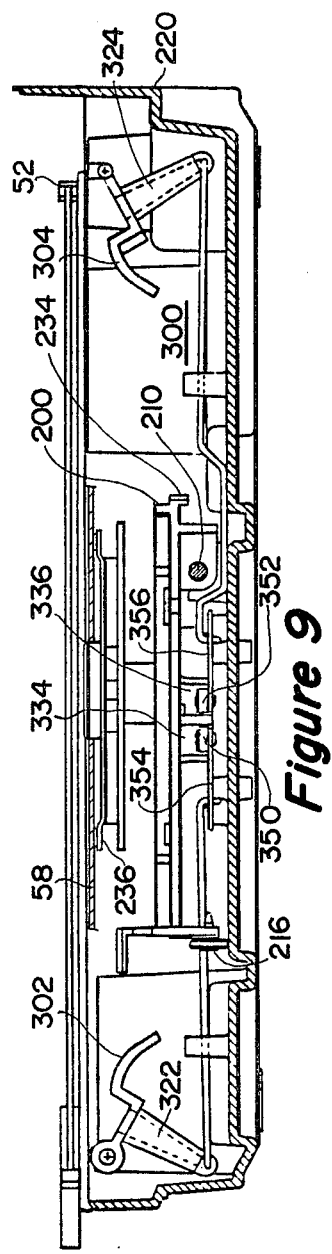

FIGS. 6 and 7 depict the plan views of the video disc player of FIG. 1 with the FIG. 5 carriage respectively located at a standby position and at an intermediate position; and FIGS. 8 and 9 illustrate the side views of the FIG. 1 video disc player corresponding to FIGS. 6 and 7 respectively, with the record receiver pads shown at the raised and lowered positions thereof.

Figure 2:
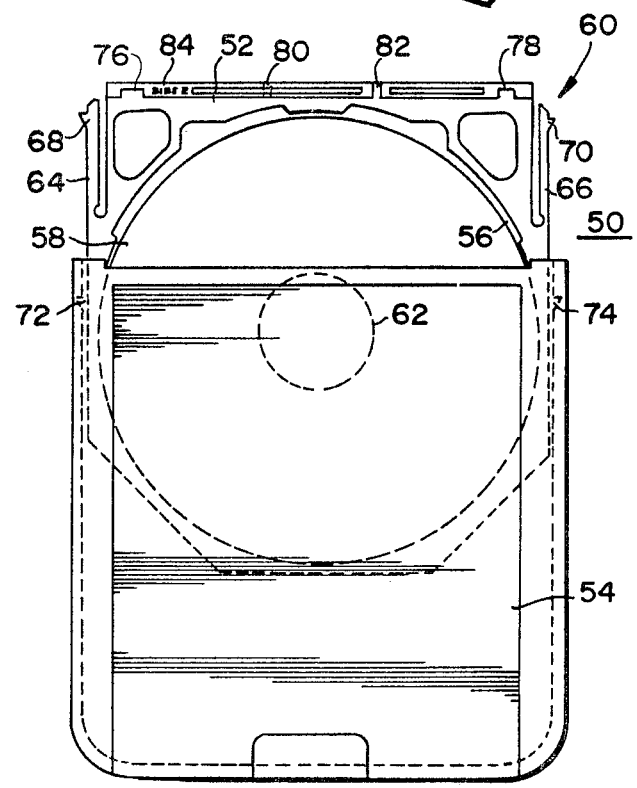
FIG. 2 represents a video disc caddy suitable for use with the player of FIG. 1.

Shown in FIG. 1 is a video disc player 20. To play a disc, a video disc caddy 50, illustrated in FIG. 2, is inserted into the input slot 22 disposed in the front panel. The player is equipped with a record extraction mechanism 250 of the type disclosed in the aforesaid U.S. Pat. No. 4,451,912 of Kirschner. The record extraction mechanism 250, depicted in FIGS. 6 and 7, withdraws the record/spine assembly from the sleeve and retains it within the player resting on a set of record receiver pads upon retraction of the sleeve. The record is automatically deposited on the turntable for playback through a conventional television receiver. After playback, the record is automatically transferred to the receiver pads for retrieval. At any point during playback, the viewer has the option of rejecting the remainder of the record by depressing the UNLOAD/OFF button 24. To retrieve the record, an empty caddy is inserted into the input slot 22 to recapture and extract the record/spine assembly from the player. The PAUSE/PLAY button 26 enables the user to interrupt the program at any time. The buttons 28 and 30 respectively allow high speed forward and reverse record scans. The player is fitted with buttons 32 and 34 to respectively achieve forward and reverse visual searches of the record. The button 36 permits the operator to select one of two audio channels in the event of a bilingual record. An LED display 38 indicates elapsed time. The player is turned off by depressing the UNLOAD/OFF button 24.

The FIG. 2 caddy 50 consists of a planar record retaining spine 52 removably enclosed in a flat outer sleeve 54. The retaining spine 52 has an opening 56 in which a centrally-apertured record 58 is received forming a record/spine assembly 60. Integrally molded with the spine 52 are spine locking fingers 64 and 66 for releasably capturing the spine in its sleeve 54. The spine locking fingers 64 and 66 are fitted with protruding elements 68 and 70 which are received in the respective recesses 72 and 74 provided in the sleeve 54 to hold the spine 52 in place. The spine 52 has cutouts 76 and 78 in which the respective spine latching members of the player record extraction mechanism 250 are selectively received to secure the spine to the player. The front edge of the spine 52 has slots 80 and 82 in which a side-to-side locating member of the player is received upon caddy insertion to accurately locate the record/spine assembly 60 in the player. The spine 52 is further provided with record side identifying indicia 84.

Figure 3:
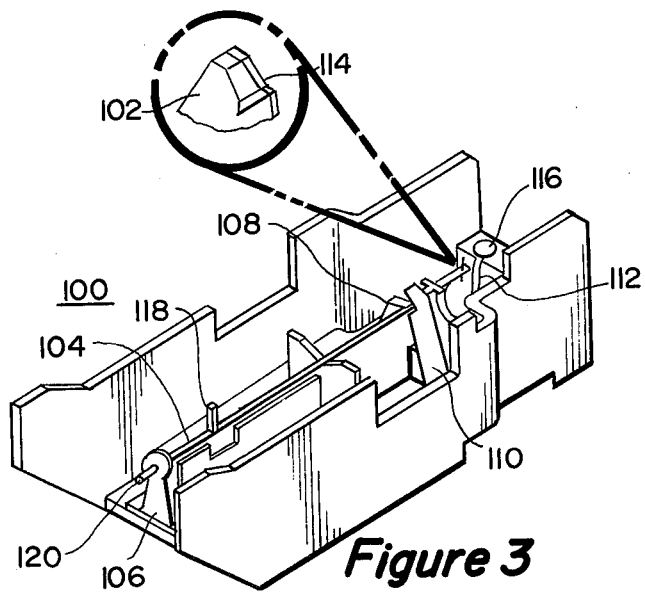
FIG. 3 depicts an upside-down, perspective view of a pickup cartridge in which the pickup stylus of the FIG. 1 video disc player is housed.

As shown in FIG. 3, a pickup stylus 102 is mounted at one end of a stylus arm 104, the other end of which is suspended in a protective cartridge 100, depicted upside-down, by means of a suspension 106. A pair of retaining members 108 and 110 hold the stylus arm 104 within the cartridge during storage and handling. A dualpurpose flylead 112 connects an electrode 114 disposed on the stylus 102 with a terminal 116 on the cartridge. The flylead 112 also serves to provide the record/stylus tracking force during play. Upon installation of the cartridge in the player, the retaining members 108 and 110 are defeated to release the stylus arm 104, and the cartridge terminal 116 is coupled to the player pickup circuits in the manner explained later.

Figure 4:
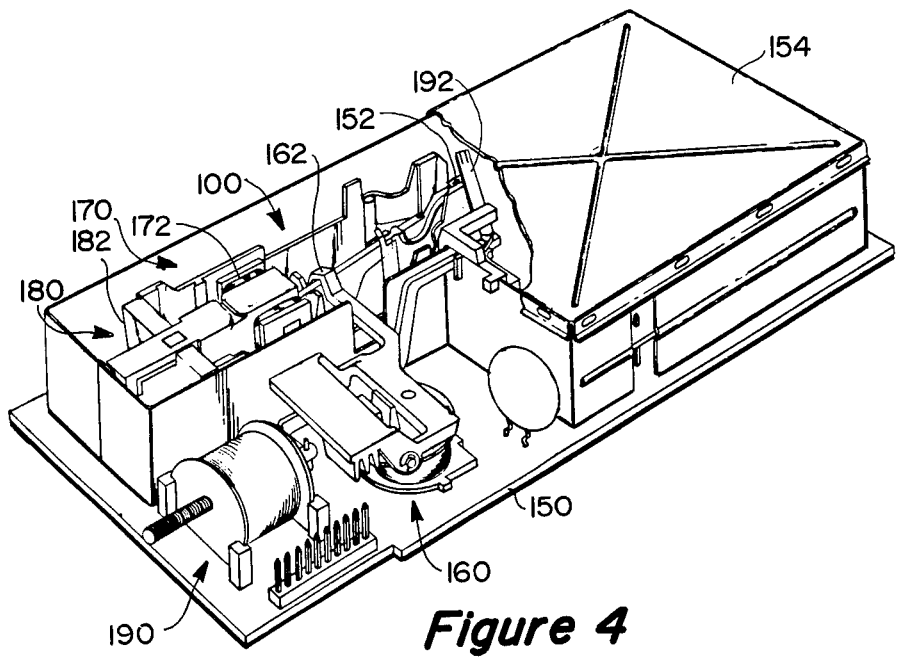
FIG. 4 is a perspective view of an interconnect board on which the pickup cartridge of FIG. 3 is installed along with a number of stylus control mechanisms.

The pickup cartridge is installed upside-down on an interconnect board 150 as shown in FIG. 4. Upon installation of the cartridge, the cartridge terminal 116 engages a terminal 152 of the pickup circuits 154 housed on the interconnect board 150. Further disposed on the interconnect board 150 are a number of stylus control mechanisms. The stylus arm lifting/lowering mechanism 160 includes a stylus arm rest 162, which is selectively activated to separate the stylus from a turntable-mounted disc for storage, and to allow it to engage the disc for playback. (Refer to U.S. patent application, Ser. No. 449,314, of Brauer.) A groove skipper mechanism 170 comprises a permanent magnet 118 mounted on the stylus arm 104 at right angles to it, and an electromagnet 172 mounted on the interconnect board 150 near the skipper magnet. The groove skipper mechanism 170, when activated, serves to displace the stylus 102 laterally of the record, for example, in order to cause the stylus to skip ahead or back. (See U.S. Pat. No. 4,258,233 issued to Simshauser.) Further supported on the interconnect board 150 is an armstretcher mechanism 180 including a further permanent magnet 120 disposed axially inside the stylus arm 104, and an electromagnet 182 located on the interconnect board 150 adjacent to it. When signals are applied to the armstretcher electromagnet 182, it produces magnetic fields which interact with the stylus arm-mounted, axial magnet 120 to cause front-to-back motion of the stylus arm 104 in a manner opposing the cyclical errors in the stylus/record relative velocity during playback. (Refer to U.S. patent application, Ser. No. 366,644, of Taylor et al.) A stylus cleaner mechanism 190 includes a cleaner arm 192, which is selectively actuated to wipe the stylus 102. (U.S. patent application, Ser. No. 426,009, of Hackett et al. illustratively discloses a stylus cleaner mechanism.)

The interconnect board, with the cartridge and the stylus control mechanisms mounted thereon, is, in turn, installed on a carriage 200 shown in FIG. 5 by means of a pair of screws. Upon installation of the interconnect board assembly on the carriage 200, a pair of tabs 202 and 204, secured to the carriage, pry open the retaining fingers 108 and 110 of the cartridge to free the stylus arm 104. Further disposed on the carriage 200 is a shielding element 206 to contain the electro-magnetic radiation generated by the player pickup circuits 154. A cartridge height adjusting screw 208 properly orients the cartridge upon installation.

In the manner indicated in FIGS. 6-9, the carriage 200, shown without the interconnect board assembly, is translatably mounted in the player by passing a rod 210 through a pair of openings 212 and 214 provided in the carriage. Disposed on the other side of the carriage 200 is a roller 216 mounted on a pin 218 fixedly secured to the carriage. The roller 216 rides in an integrally-molded groove (not shown) in the player housing 220.

The carriage 200 is reciprocably mounted in the player for motion along a path between a standby position 222, out of registry with, and an end-of-play position 226, in registry with the turntable-disposed record 58 retained inside the player. A motor 230 drives the carriage 200 via a gear 232, which engages a rack 234 integrally molded with the carriage. The carriage 200 is rapidly advanced from the off-record standby position 222 to a start-of-play position (not shown) underneath the turntable-mounted record 58. At that point, the stylus lifting/lowering mechanism 160 is operated to permit the stylus 102 to engage the underside of record 58 supported on a rotatable turntable 236. The carriage 200 is then driven to cause it to follow the groove-engaging stylus 102. When the carriage 200 reaches the end-of-play position 226, the stylus lifting/lowering mechanism 160 is again actuated to separate the stylus 102 from the turntable-supported record 58. The disc 58 is provided with a bank containing end-of-play signals to indicate the arrival of the carriage 200 at the end-of-play position 226. The motor 230 is then reversed to rapidly drive the carriage 200 back to the off-record standby position 222 indicated in FIGS. 6 and 8. The player is equipped with a set of carriage-actuated switches (not shown) to sense the arrival of the carriage 200 at the off-record standby and under-the-record start-of-play positions.

To load the record 58 into the player, the full caddy 50 is inserted into the player along a pair of guide rails 252 and 254. As the caddy reaches its fully inserted position, a pair of spine releasing members 256 and 258 of a record extraction mechanism 250 located at the rear of the player enter the sleeve 54 to defeat the spine locking fingers 64 and 66 of the spine 52 to free it from the sleeve. Simultaneously, a pair of spine latching members 260 and 262 of the record extraction mechanism 250 enter the cutouts 76 and 78 provided in the spine 52 to lock it to the player. When the sleeve 54 is extracted from the player, the record/spine assembly 60 is left inside the player in the manner explained below. The details of the record extraction mechanism 250 are given in the afore-mentioned Kirschner's U.S. Pat. No. 4,451,912.

In accordance with this invention, the player is equipped with a disc handling mechanism 300 illustrated in FIGS. 6-9. The subject disc handling mechanism comprises a pair of front and back record receiver pads 302 and 304 to support the record 58 retained inside the player as the sleeve 54 is withdrawn, in the manner depicted in FIG. 8. A pair of integrally-molded pins 306 and 308 of the front receiver pad 302 are received in the respective openings in the integrally-molded posts 310 and 312 of the player housing 220 to pivotally support the front pad for motion between a raised position, shown in FIG. 8, and a depressed position, shown in FIG. 9. Similarly, a pair of integrally-molded pins 314 and 316 of the rear receiver pad 304 are received in the respective openings in the integrally-molded posts 318 and 320 of the player housing 220 to pivotally support the rear pad between a raised and a depressed position, depicted respectively in FIGS. 8 and 9.

The instant disc handling mechanism 300 further includes a pair of actuating members 330 and 332 disposed on the underside of the carriage 200 at a non-perpendicular angle to the carriage path as depicted in FIG. 5. Each of the angular actuating members 330 and 332 has respective leading portions 334 and 336 disposed at a first angle to the carriage path and respective trailing portions 338 and 340 arranged at a second angle to the carriage path for the reasons given subsequently.

The angular actuating members 330 and 332 of the carriage 200 are subject to engagement with rollers 350 and 352 mounted on the respective one of a pair of actuated members 354 and 356. The actuated members 354 and 356 are pivotally mounted to the player housing 220 by means of screws 358 and 360. The opposite ends of the actuated members 354 and 356 are linked to the front and back receiver pads 302 and 304 by means of the respective one of a pair of connecting rods 370 and 372. One end of the connecting rod 370 is received in a leg portion 322 of the front receiver pad 302. The other end of the connecting rod 370 is received in a forked portion 362 of the actuated member 354, and held in place by a wire spring 364. (See FIG. 6.) Similarly, one end of the connecting rod 372 is received in a leg portion 324 of the rear receiver pad 304. The other end of the connecting rod 372 is received in a forked portion 366 of the actuated member 356, and held in place by means of another wire spring 368.

As the carriage 200 moves from the off-record standby position 222 indicated in FIGS. 6 and 8 to an off-record intermediate position 224 indicated in FIGS. 7 and 9, the record 58 is transferred from the receiver pads 302 and 304 to the turntable 236. The chronology of activities is as follows.

The weight of the disc 58 and the receiver pads 302 and 304 urge the rollers 350 and 352 of the actuated members 354 and 356 against the carriage-mounted actuating members 330 and 332.

The angular actuating members 330 and 332 allow the roller-mounted ends of the actuated members 354 and 356 to move toward each other as the carriage 200 proceeds from the FIG. 6 standby position 222 to the FIG. 7 intermediate position 224.

The forked ends 362 and 366 of the actuated members 354 and 356 are spread apart.

The connecting rods 370 and 372 push the respective leg portions 322 and 324 of the receiver pads 302 and 304 away from each other.

The front and back receiver pads 302 and 304 move from their FIG. 8 raised position to their FIG. 9 depressed position to transfer the record 58 from the receiver pads to the turntable 236 for rotation therewith. While the record 58 is lowered to the turntable 236, the spine 52 is held in place above the turntable.

As the carriage 200 arrives at the start-of-play position underneath the turntable-mounted record 58, the stylus 102 is caused to engage the record 58 to start the playback. During playback, the carriage 200 is driven to follow the groove-engaging styus 102. It will be noted that the front and back receiver pads 302 and 304 are disposed beneath the turntable 236 during playback to allow the rotation of the turntable-disposed record 58 free from any interference by the receiver pads. Also, the rollers 350 and 352 mounted on the actuated members 354 and 356 clear the leading portions 334 and 336 of the respective actuating members 330 and 332 as the carriage 200 moves from the intermediate position 224 toward the end-of-play position 226 to permit the translation of the carriage without hindrance from the actuated members during playback. After playback, the stylus 102 is separated from the turntable-mounted record 58, and driven back toward the standby position 222 indicated in FIGS. 6 and 8.

As the carriage 200 proceeds from the FIG. 7 intermediate position to the FIG. 6 standby position after playback, the record 58 is transferred from the turntable 236 to the receiver pads 302 and 304 to redefine the record/spine assembly 60 for withdrawal. The sequence of events is reversed as follows.

- The carriage-mounted angular actuating members 330 and 332 spread apart the roller-mounted ends of the actuated members 354 and 356.
- The forked ends 362 and 366 of the actuated members 354 and 356 move toward each other.
- The connecting rods 370 and 372 pull the respective leg portions 322 and 324 of the receiver pads 302 and 304 toward each other.
- The front and back receiver pads 302 and 304 are lifted up from their FIG. 9 depressed position to their FIG. 8 raised position to transfer the record 58 from the turntable 236 back to the receiver pads, whereby the record/spine assembly 60 is redefined for retrieval. As noted above, the receiver pads 302 and 304 lift and lower the record 58, while the spine is locked in place above the turntable 236.

An empty sleeve 54 is then reinserted into the player to recapture the record/spine assembly 60. As the sleeve 54 is fully inserted, the spine locking fingers 64 and 66 of the spine 52 lock it to the sleeve. Simultaneously, the front edge of the sleeve 54 engages and rotates away the spine releasing members 256 and 258 of the record extraction mechanism 250 to, in turn, lift the spine latching members 260 and 262 out of the cutouts 76 and 78 in the spine 52 to release it from the player. The full caddy 50 is then extracted from the player.

To recapitulate the operation of the instant disc handling mechanism 300, as the carriage 200 moves toward the turntable 236 for playback, the front and back receiver pads 302 and 304 are lowered to transfer a record resting thereon to the turntable for rotation therewith without hindrance from the receiver pads during the translation of the carriage from the FIG. 6 off-record standby position 222 to the FIG. 7 off-record intermediate position 224. During playback, the rollers 350 and 352 mounted on the actuated members 354 and 356 are out of engagement with the carriage-mounted actuating members 330 and 332 to allow carriage translation without interference from the subject disc handling mechanism 300. After playback, when the carriage 200 proceeds back toward the FIG. 6 standby position 222, a turntable-mounted record is lifted back up by the receiver pads 302 and 304 to redefine the record/spine assembly for removal from the player.

To assure that the record/spine assembly is redefined after playback so that it can be retrieved from the player, it is important to make sure that the receiver pads 302 and 304 are raised back up to the correct height when the carriage 200 reaches the standby position 222. To this end, the forked ends 362 and 366 of the actuated members 354 and 356 are driven closer together than they need to be as the carriage 200 arrives at the standby position 222. In other words, the actuated members 354 and 356 are caused to overtravel during the translation of the carriage 200 toward the standby position 222. The wire springs 364 and 368 disposed on the actuated members 354 and 356 bias the receiver pads 302 and 304 against the respective stops (not shown) in the player to assure disposition of the receiver pads at the correct height upon arrival of the carriage 200 at the standby position 222.

The force on the carriage motor 230 as the carriage 200 is driven toward the standby position 222 primarily comprises of a first load component due to having to lift the weight of the record 58 and the receiver pads 302 and 304, and a second load component due to having to bend the wire springs 364 and 368 to assure loading of the receiver pads against the respective stops in the player. The first load component due to the weight of the record 58 and receiver pads 302 and 304 is substantially constant throughout the translation of the carriage 200 from the intermediate position 224 to the standby position 222. However, the second load component due to the wire springs 364 and 368 comes into existence only toward the end of the carriage translation as the receiver pads 302 and 304 bear against the respective stops in the player.

For a given load, the force experienced by the carriage motor 230 is a function of the sine of the angle subtended by the angular actuating members with the carriage path. In other words, for a given load, the smaller the angle between the angular actuating members 330 and 332, the smaller the drag on the carriage motor 230, and vice versa.

To compensate for the increase in load due to the bending of the wire springs 364 and 368 as the carriage 200 approaches the standby position 222, the angle subtended between the trailing portions 338 and 340 of the angular actuating members 330 and 332 is made smaller than the angle between the leading portions 334 and 336. This arrangement assures substantially uniform load on the carriage motor 230.

The subject disc handling mechanism 300 is not only cost effective, but it reliably achieves the transfer of a record retained inside the player from the receiver pads to the turntable and vice versa.

What is claimed is:

1. In a player for recovering prerecorded information from a turntable-mounted disc record by means of a signal pickup when record/pickup relative velocity is established; said signal pickup being housed in a carriage which is translatably mounted in said player for motion along a path between a standby position out of registry with, and an end-of-play position in registry with said turntable-mounted record; means for selectively driving said carriage; said player having a record receiving means subject to disposition in a raised position and a lowered position relative to said turntable; said record receiving means supporting said record when occupying said raised position thereof; said record receiving means depositing said record on said turntable for rotation therewith free from any hindrance by said record receiving means when disposed at its lowered position; record handling apparatus comprising:

(A) a movably-mounted actuated member for establishing relative motion between said record receiving means and said turntable for transferring a record from said record receiving means to said turntable and vice versa; and (B) an angular actuating member disposed on said carriage at a non-perpendicular angle to said carriage path; said angular actuating member engaging one end of said actuated member as said carriage arrives at an intermediate position thereof along said carriage path during the translation of said carriage toward said standby position; further motion of said carriage toward said standby position displacing said one end of said actuated member in a direction substantially at right angles to said carriage path and in a manner disposing said record receiving means at said raised position, whereby a turntable-supported record is transferred to said record receiving means.

2. The apparatus set forth in claim 1 wherein, during the translation of said carriage from said standby position to said intermediate position, said angular actuating member allows the motion of said actuated member in a direction substantially at right angles to said carriage path and in a manner permitting said record receiving means to occupy said lowered position thereof to transfer a record disposed on said receiving means to said turntable for rotation therewith without hindrance from said record receiving means.

3. The apparatus defined in claim 2 wherein said disposition of said record receiving means in said lowered position thereof during the motion of said carriage from said standby position to said intermediate position to transfer said record to said turntable occurs under the gravitational force.

4. The claim 1 apparatus wherein said carriage-mounted actuating member has a leading portion that is disposed at a first angle to said carriage path for effecting motion of said record receiving means at a first rate of speed during the initial translation of said carriage from said intermediate position toward said standby position; said carriage-mounted actuating member having a further trailing portion that is arranged at a second angle to said carriage path for causing motion of said record receiving means at a second rate of speed during further translation of said carriage toward said standby position.

5. The apparatus of claim 4 wherein said second angle being smaller than said first angle so that the rate of translation of said record receiving means is reduced as said carriage approaches said standby position, whereby the load on said carriage driving means due to said translation of said record receiving means is, in turn, reduced as said carriage reaches said standby position.

6. The apparatus as defined in claim 1 wherein said record receiving means comprises at least one record receiving pad movably mounted in said player for motion between a raised position supporting a record above said turntable and a lowered position below said turntable permitting a turntable-mounted record to rotate freely without hindrance from said record receiving pad.

7. The apparatus set forth in claim 6 wherein said record receiving pad is pivotally mounted in said player for motion between said raised and lowered positions.

8. The apparatus of claim 7 wherein said actuated member is pivotally mounted in said player with its other end coupled to said record receiving pad for effecting said record transfer.

9. The claim 8 apparatus wherein said coupling between said record receiving pad and said actuated member comprises a linking member having one end thereof yieldably connected to one of said record receiving pad and said actuated member.

10. The apparatus outlined in claim 9 wherein said yieldable connection comprises a cutout provided in said actuated member for receiving said linking member and a spring member disposed on said actuated member for maintaining said linking member in said cutout.

11. The apparatus set forth in claim 1 for use with said record receiving means comprising a pair of record receiving pads movably mounted in said player for motion between a raised position supporting a record over said turntable and a lowered position beneath said turntable allowing a turntable-disposed record to rotate freely without interference from said record receiving pads.

12. The apparatus as defined in claim 10 further including a pair of movably-mounted actuated members coupled to the respective one of said record receiving pads; said apparatus additionally having a pair of angularly-mounted actuating members disposed on said carriage; said angular actuating members engaging the respective one of said actuated members as said carriage reaches said intermediate position thereof during said carriage translation toward said standby position; further translation of said carriage toward said standby position displacing said actuated members in a manner lifting said record receiving pads to, in turn, pick up a turntable-supported record.

* * * * *

UNITED STATES PATENT AND TRADEMARK OFFICE
CERTIFICATE OF CORRECTION

PATENT NO. : 4,486,874
DATED : December 4, 1984
INVENTOR(S) : Clyde F. Coleman

It is certified that error appears in the above—identified patent and that said Letters Patent is hereby corrected as shown below:

Col. 4, line 5 - "dualpurpose" should be - dual-purpose -.

Col. 5, line 19 - "with a bank" should be - with a band -.

Signed and Sealed this

Thirtieth Day of April 1985

[SEAL]

Attest:

DONALD J. QUIGG

Attesting Officer

Acting Commissioner of Patents and Trademarks